(12) United States Patent
Perez et al.

(10) Patent No.: US 10,994,795 B1
(45) Date of Patent: May 4, 2021

(54) MOBILITY-ASSIST HYBRID CONVERSION VEHICLES AND METHODS OF MANUFACTURING THE SAME

(71) Applicant: Vantage Mobility International, LLC, Phoenix, AZ (US)

(72) Inventors: Michael Lindfors Perez, Phoenix, AZ (US); Mark Charles Miller, Phoenix, AZ (US); Kirsten Nichole Mangum, Phoenix, AZ (US); Steven Paul Ungetheim, Phoenix, AZ (US)

(73) Assignee: Vantage Mobility International, LLC, Phoenix, AZ (US)

( * ) Notice: Subject to any disclaimer, the term of this patent is extended or adjusted under 35 U.S.C. 154(b) by 0 days.

(21) Appl. No.: 17/157,092

(22) Filed: Jan. 25, 2021

(51) Int. Cl.

| | |
|---|---|
| *B62D 65/00* | (2006.01) |
| *B62D 65/02* | (2006.01) |
| *B62D 25/20* | (2006.01) |
| *B60R 16/02* | (2006.01) |
| *A61G 3/06* | (2006.01) |
| *B60P 1/43* | (2006.01) |
| *B62D 65/12* | (2006.01) |
| *B60K 15/067* | (2006.01) |
| *B62D 65/16* | (2006.01) |

(Continued)

(52) U.S. Cl.
CPC .......... *B62D 65/026* (2013.01); *A61G 3/061* (2013.01); *B60K 6/28* (2013.01); *B60K 15/067* (2013.01); *B60K 17/34* (2013.01); *B60L 58/26* (2019.02); *B60N 2/012* (2013.01); *B60N 2/015* (2013.01); *B60P 1/433* (2013.01); *B60R 16/0207* (2013.01); *B62D 25/20* (2013.01); *B62D 65/04* (2013.01); *B62D 65/12* (2013.01); *B62D 65/16* (2013.01); *B60Y 2200/92* (2013.01)

(58) Field of Classification Search
CPC ...... B62D 65/026; B62D 25/20; B62D 65/04; B62D 65/12; B62D 65/16
See application file for complete search history.

(56) References Cited

U.S. PATENT DOCUMENTS 4,847,972 A * 7/1989 Anderson .............. A61G 3/066
29/401.1
6,071,064 A * 6/2000 Hackett ................. A61G 3/066
414/545

(Continued)

*Primary Examiner* — Hau V Phan
(74) *Attorney, Agent, or Firm* — Fennemore Craig, P.C.

(57) ABSTRACT

Methods and systems for producing a mobility assist hybrid vehicle from an OEM hybrid vehicle may include: Removing the hybrid battery from the hybrid vehicle; removing at least a portion of a floor of the hybrid vehicle that extends from about a longitudinal position to about a second longitudinal position; mounting a replacement floor assembly to the hybrid vehicle, the replacement floor assembly defining a battery well sized to receive the hybrid battery, the battery well being located at about the first longitudinal position, the replacement floor assembly also being configured to receive a mobility access system at about the second longitudinal position; mounting the hybrid battery within the battery well of the replacement floor assembly; placing a first cover plate over the hybrid battery; mounting the mobility access system to the replacement floor assembly; and placing a second cover plate over the mobility access system, the first and second cover plates defining a substantially flat interior floor area for the first and second rows of occupant seating.

12 Claims, 14 Drawing Sheets

(51) Int. Cl.
*B60K 17/34* (2006.01)
*B62D 65/04* (2006.01)
*B60N 2/015* (2006.01)
*B60N 2/01* (2006.01)
*B60L 58/26* (2019.01)
*B60K 6/28* (2007.10)

(56) References Cited

U.S. PATENT DOCUMENTS

| | | | | |
|---|---|---|---|---|
| 6,089,817 | A * | 7/2000 | Tauer | B60P 1/4428 |
| | | | | 414/558 |
| 6,825,628 | B2 * | 11/2004 | Heigl | A61G 3/061 |
| | | | | 318/266 |
| 7,837,203 | B1 * | 11/2010 | Schmidt | B60G 3/185 |
| | | | | 280/6.152 |
| 8,926,254 | B2 * | 1/2015 | Pocobello | A61G 3/061 |
| | | | | 414/537 |
| 9,101,519 | B2 * | 8/2015 | Smith | A61G 5/08 |
| 9,126,522 | B1 * | 9/2015 | Perez | B60P 1/431 |
| 10,010,461 | B2 * | 7/2018 | Kitchin | B60P 1/433 |
| 10,562,722 | B2 * | 2/2020 | Pugh | B62D 21/11 |
| 2004/0146385 | A1 * | 7/2004 | Edwards | B60P 1/431 |
| | | | | 414/537 |
| 2004/0146386 | A1 * | 7/2004 | Goodrich | A61G 3/062 |
| | | | | 414/546 |
| 2006/0245883 | A1 * | 11/2006 | Fontaine | B60P 1/431 |
| | | | | 414/537 |
| 2014/0356118 | A1 * | 12/2014 | Friedlinghaus | A61G 3/0808 |
| | | | | 414/523 |
| 2016/0221607 | A1 * | 8/2016 | Schmidt | A61G 3/0808 |

* cited by examiner

MOBILITY-ASSIST HYBRID CONVERSION VEHICLES AND METHODS OF MANUFACTURING THE SAME

TECHNICAL FIELD

The present invention relates to mobility assist vehicles in general and more particularly to methods and systems for converting OEM hybrid-type vehicles into mobility assist vehicles.

BACKGROUND

Mobility assist or wheelchair accessible vehicles are well-known in the art and are commonly provided with mobility access systems, such as deployable lifts or ramps, to allow persons requiring wheelchairs or other types of mobility assist systems to readily enter the vehicles, either to drive the vehicles or to ride along. Many such vehicles have side-deploying lifts or ramps, meaning that the lifts or ramps extend and retract from the sides of the vehicles. In other vehicles, the lifts or ramps may be deployed from the rear.

Most mobility-assist or wheelchair accessible vehicles are converted from OEM (original equipment manufacturer) vehicles, commonly minivans, although other types of vehicles, such as sport utility vehicles (SUVs) and vans are also converted for such use. However, OEM vehicles are increasingly of the hybrid type, in which the energy to propel the vehicle is derived both from an internal combustion engine and from an electric storage battery. Such hybrid vehicles use one or more electric motors to supplement or assist the motive force provided by the internal combustion engine. In other arrangements, the electric motor may provide the sole motive force for driving the vehicle. In any event, such hybrid vehicles are difficult to convert to wheelchair accessible vehicles due to the additional components and systems involved, primarily the electric motor(s) and battery packs, although other systems specific to such vehicles may also complicate the conversion process.

Moreover, the conversion of a hybrid vehicle is not a simple matter of relocating components to provide space for the mobility access system. The converted vehicle must still meet certain requirements relating to vehicle performance, handling, and safety. Such vehicles must also meet applicable laws and regulations relating to accessibility. In addition, the relocation of OEM vehicle components also involves additional time, thus cost, and may also require the fabrication and installation of additional components and systems required to connect the relocated components to the associated OEM vehicle systems. Consequently, the conversion of an OEM vehicle, and particularly a hybrid OEM vehicle, to a mobility assist vehicle is by no means trivial, and requires a careful consideration and balancing of the various tradeoffs, design factors, and conversion costs involved.

SUMMARY OF THE INVENTION

One embodiment of a method of producing a mobility assist hybrid vehicle from an OEM hybrid vehicle may include: Removing the hybrid battery from the hybrid vehicle; removing at least a portion of a floor of the hybrid vehicle, the removed portion of the floor including at least a portion of the floor extending from about a first longitudinal position to about a second longitudinal position; mounting a replacement floor assembly to the hybrid vehicle, the replacement floor assembly defining a battery well sized to receive the hybrid battery, the battery well being located at about the first longitudinal position, the replacement floor assembly also being configured to receive a mobility access system at about the second longitudinal position; mounting the hybrid battery within the battery well of the replacement floor assembly; placing a first cover plate over the hybrid battery; mounting the mobility access system to the replacement floor assembly; and placing a second cover plate over the mobility access system, the first and second cover plates defining a substantially flat interior floor area for the first and second rows of occupant seating.

Also disclosed is a method of producing a wheelchair-accessible hybrid vehicle from an hybrid vehicle that includes the steps of: Removing at least a portion of a floor of the hybrid vehicle, the removed portion of the floor including at least a portion of the floor that extends from about a first longitudinal position to about a second longitudinal position; mounting a replacement floor assembly to the hybrid vehicle, the replacement floor assembly defining a battery compartment sized to receive the hybrid battery, the battery compartment being located at about the first longitudinal position; positioning the hybrid battery within the battery compartment of the replacement floor assembly; placing a cover over the electric storage battery; and mounting a mobility access system to the replacement floor assembly at about the second longitudinal position to produce the wheelchair-accessible hybrid vehicle, portions of the replacement floor assembly and the cover defining a substantially flat interior floor area that extends substantially continuously from about the first longitudinal position to about the second longitudinal position.

Also disclosed is a mobility access hybrid vehicle that includes a floor assembly that defines a mobility access system mounting area and a battery well, the battery well being located at a position forward of the mobility access system mounting area. A mobility access system is mounted within the mobility access system mounting area defined by the floor assembly. A hybrid battery is mounted within the battery well defined by the floor assembly. A first cover plate mounted over the battery well and a second cover plate mounted over the mobility access system together define a substantially flat interior floor area for first and second rows of occupant seating areas of the mobility access hybrid vehicle.

A replacement floor assembly is also disclosed that may be used to convert a hybrid vehicle into a mobility assist hybrid vehicle. The replacement floor assembly may include a base member having a top side, a bottom side, a front end, a rear end, a left side, and a right side. The front end and forward portions of the left and right sides define a forward section of the base member, whereas the rear end and rear portions of the left and right sides define a rear section of the base member. A first longitudinal stiffener member mounted to the top side of the forward section of the base member extends from about the front end of the base member to about a rear extent of the forward section of the base member. A second longitudinal stiffener member mounted to the top side of the forward section of the base member in generally parallel, spaced-apart relation to the first longitudinal stiffener member extends from about the front end of the base member to about the rear extent of the forward section of the base member. A first cross-member mounted to the top side of the base member at about the rear extent of the forward section of the base member extends from at least about the first longitudinal stiffener member to at least about the second longitudinal stiffener member so that the first and second longitudinal stiffener members and the first cross-member define a battery well therebetween.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
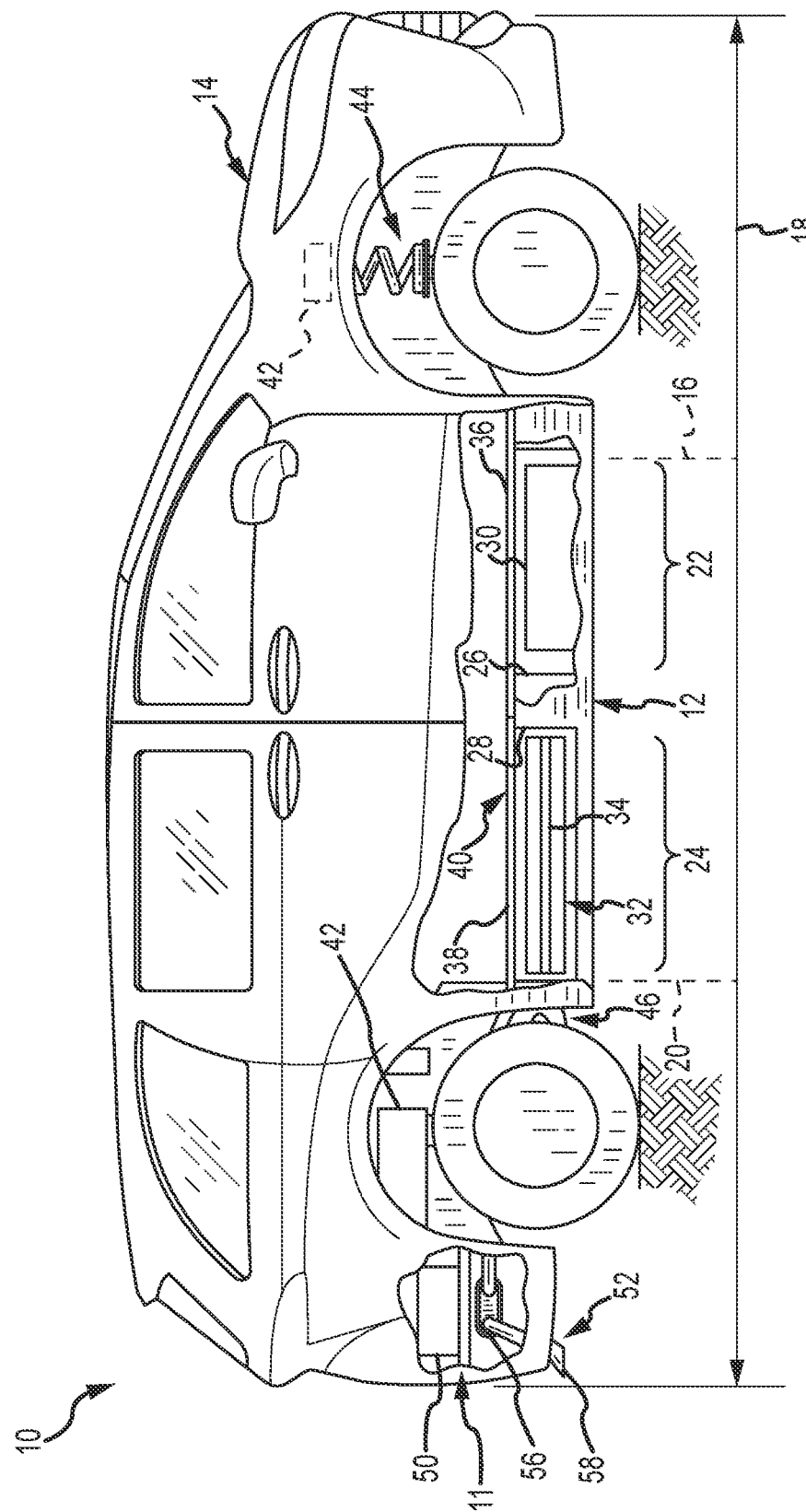
FIG. 1 is a right side view in elevation of one embodiment of a mobility assist hybrid vehicle with a portion of the lower vehicle body broken away to show the relative arrangement of certain components associated with the mobility assist hybrid vehicle.
Figure 2:
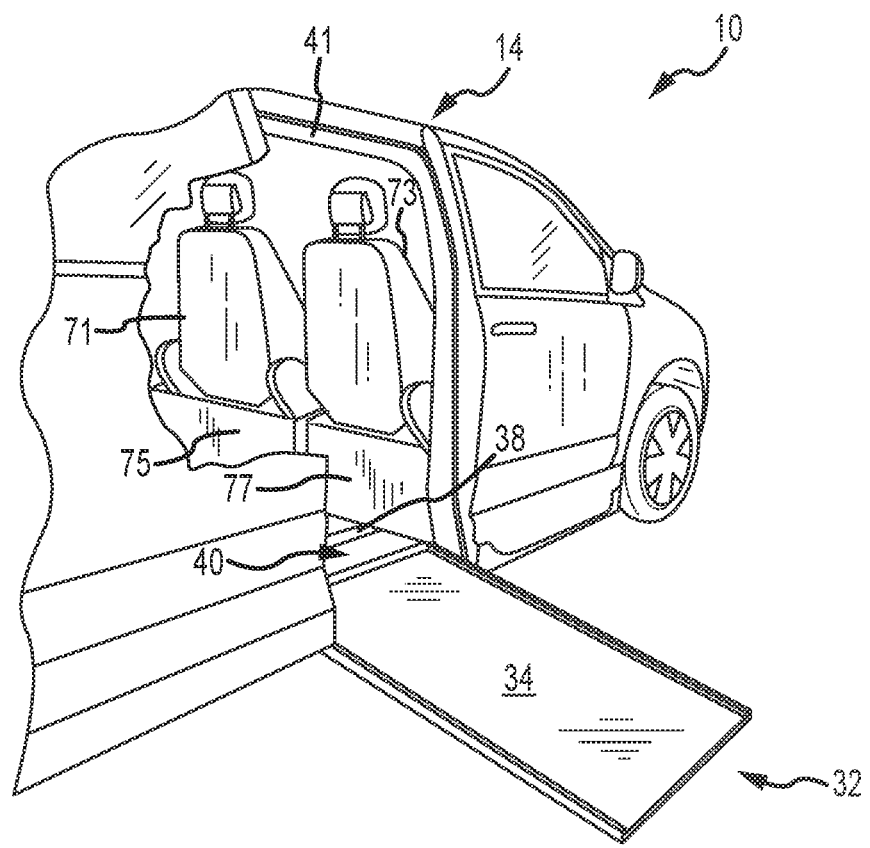
FIG. 2 is a right side view in perspective of a portion of the mobility assist hybrid vehicle illustrated in FIG. 1 with an in-floor vehicle ramp shown in the deployed position.

One embodiment of a mobility assist hybrid vehicle 10 according to the teachings provided herein is illustrated in FIGS. 1 and 2 as it could be derived from an OEM hybrid minivan vehicle (not shown in unmodified form) that has been modified or converted for mobility assist use. In the particular embodiment shown and described herein, the mobility assist hybrid vehicle 10 may comprise a floor assembly 12 that has been lowered with respect to the vehicle body 14 and OEM floor assembly (not shown). Floor assembly 12 may replace the OEM floor assembly previously removed from the OEM vehicle, thus may be referred to herein in the alternative as replacement floor assembly 12. The floor assembly 12 is lowered with respect to the OEM floor assembly in order to accommodate a mobility access system 32, provide sufficient headroom to allow easy ingress and egress to and from the vehicle 10, and to meet any applicable mobility access regulations, e.g., for interior headroom and/or vertical clearance.

In one embodiment, floor assembly 12 may extend from about a first longitudinal position 16 along a length 18 of the vehicle 10 to about a second longitudinal position 20 along length 18. The first longitudinal position 16 includes or encompasses a first row 22 of occupant seating, whereas the second longitudinal position 20 includes or encompasses a second row 24 of occupant seating.

Floor assembly 12 defines a battery well 26 located at about the first row 22 of occupant seating. Floor assembly 12 also defines a mobility access system mounting area 28 located at about the second row 24 of occupant seating. A hybrid battery 30, such as the OEM hybrid battery, may be mounted within the battery well 26. The mobility access system 32, such as an in-floor deployable ramp system 34, may be mounted within the mounting area 28 defined by floor assembly 12. A first cover plate 36 mounted over the battery well 26 and a second cover plate 38 mounted over the mobility access system 32 define a substantially flat interior floor area 40 for the first and second rows 22 and 24 of occupant seating.

In order to provide sufficient ground clearance for the floor assembly 12, which again has been lowered with respect to the OEM floor assembly (not shown) previously removed from the OEM vehicle, the mobility assist hybrid vehicle 10 may be provided with a plurality of body lift members or spacers 42. The body lift members or spacers 42 lift or raise the vehicle body 14 with respect to front and rear suspension assemblies, at least portions of which are depicted in the drawing Figures by reference numerals 44 and 46, respectively. Significantly, and as will be discussed in much greater detail herein, the methods and systems of the present invention do not require modification of the front and rear suspension assemblies 44 and 46, including, for example, a 'k-frame' 47 and trailing arms 49 of rear suspension assembly 46. Therefore, the mobility assist vehicle 10 may retain certain functional and structural aspects of the OEM drive line configuration.

For example, in an embodiment wherein the unmodified OEM hybrid vehicle comprises an all-wheel drive configuration having a drive motor assembly 48 (FIG. 14) mounted to k-frame 47 of rear suspension assembly 46, the mobility assist hybrid vehicle 10 will retain the all-wheel drive functionality of the unmodified OEM hybrid vehicle. That is, because the mobility assist hybrid vehicle 10 does not require modification of the OEM rear suspension assembly 46, the mobility assist hybrid vehicle 10 may retain the all-wheel drive configuration of the unmodified OEM vehicle by simply using the OEM rear suspension and drive motor assemblies 46 and 48.

The mobility assist hybrid vehicle 10 may also comprise a fuel tank 50 installed at a position behind or aft of the rear suspension assembly 46. See FIG. 6. As will be described in further detail herein, fuel tank 50 replaces the OEM fuel tank (not shown) which was mounted at a position forward of the rear suspension assembly 46 in the unmodified OEM vehicle.

Figure 9:
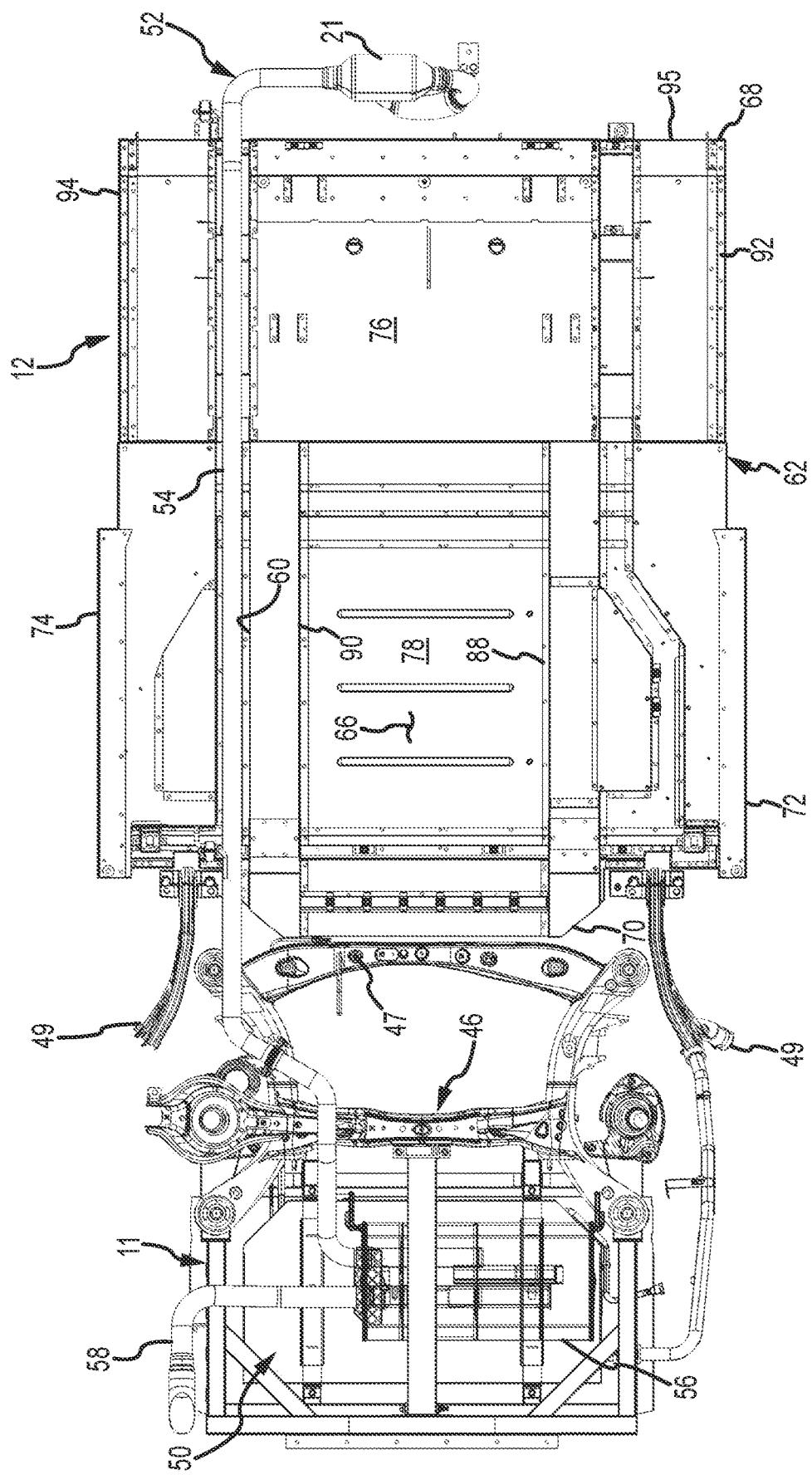
FIG. 9 is a bottom view of the components illustrated in FIG. 5 showing aspects of the rear suspension and exhaust systems.
Figure 10:
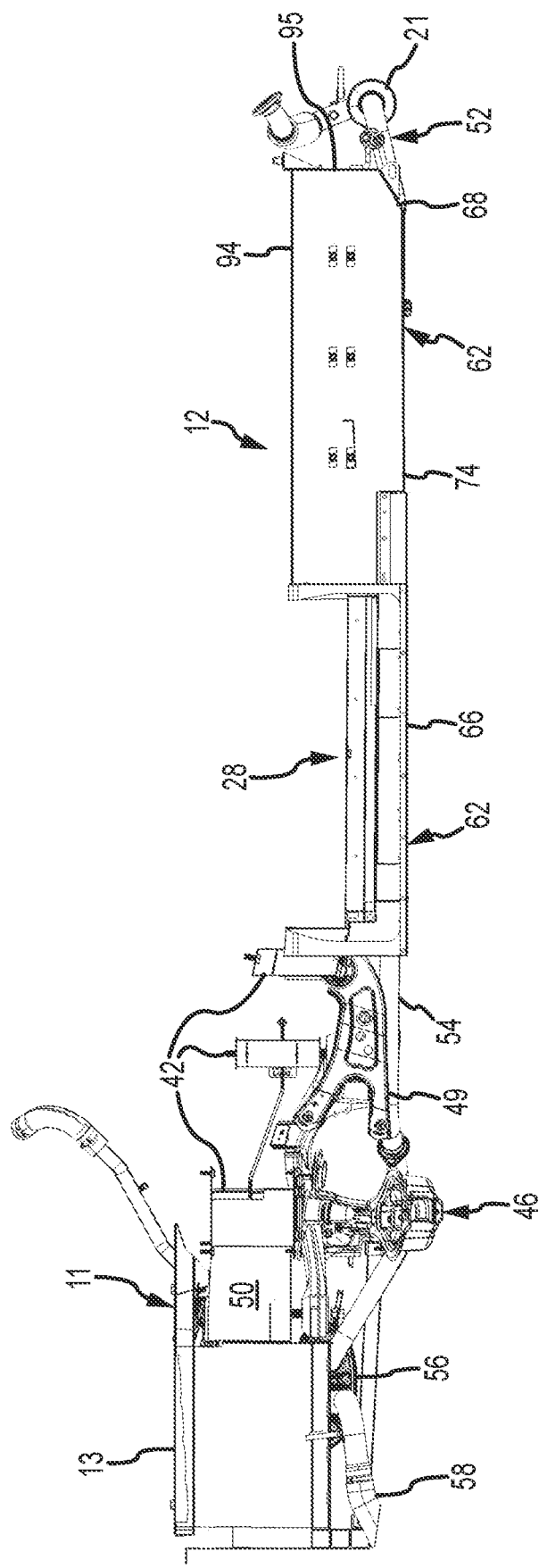
FIG. 10 is a right side view in elevation of the components illustrated in FIG. 5.

Referring now to FIGS. 9 and 10, the mobility assist vehicle 10 may also include an exhaust system 52 having an intermediate pipe 54, a muffler 56, and a tail pipe 58. At least a portion of the intermediate pipe 54 passes through an exhaust pipe channel 60 defined by floor assembly 12, as best seen in FIG. 9. The muffler 56 of exhaust system 52 is mounted to vehicle body 14 at a location aft of rear suspension assembly 46 and underneath or below fuel tank 50. Exhaust system 52 replaces the OEM exhaust system (not shown) provided with the OEM vehicle.

The mobility assist hybrid vehicle 10 may be produced from an OEM hybrid vehicle (again, not specifically shown in the drawing figures) in accordance with methods described herein. Briefly, the methods may involve removing the hybrid battery 30 from the OEM hybrid vehicle. In one embodiment, the hybrid battery 30 of the OEM hybrid vehicle is located in the passenger compartment of the OEM vehicle, at a position generally underneath and between the front seats (not shown) in the first row 22 of occupant seating. Next, a portion of the OEM floor assembly of the OEM hybrid vehicle is removed. In one embodiment, the removed portion of the OEM floor assembly may extend from about the first longitudinal position 16 along the length 18 of the vehicle to about the second longitudinal position 20. See FIG. 1. As mentioned earlier, the first longitudinal position 16 may include or encompass the first row 22 of occupant seating, whereas the second longitudinal position 20 may include or encompass the second row 24 of occupant seating.

The replacement floor assembly 12 may then be mounted to the body 14 of vehicle 10 in place of the removed OEM floor assembly. As already mentioned, the replacement floor assembly 12 defines at least a battery well 26 that is substantially aligned or coincident with the first row 22 of occupant seating. Floor assembly 12 may also define a mobility access system mounting area 28 that is substantially aligned or coincident with the second row 24 of occupant seating. After the floor assembly 12 is installed, the hybrid battery 30 previously removed from the OEM vehicle may be mounted within the battery well 26. The location of the battery well 26 at about the first row 22 of occupant seating allows the reinstalled hybrid battery 30 to be operatively connected to the vehicle 10 using unmodified existing components, e.g., the high-voltage wiring harness and associated battery control systems (not shown) of the OEM hybrid vehicle. The mobility access system 32 may then be mounted within the mounting area 28 defined by floor assembly 12. The first and second cover plates 36 and 38 may then be secured or mounted over the battery well 26 and mobility access system mounting area 28, respectively. The first and second cover plates 36 and 38 define a substantially flat interior floor area 40 for at least the first and second rows 20 and 24 of occupant seating. One or both of the seats, e.g., the driver and passenger seats 71 and 73 (FIG. 1) in the first row 22 of occupant seating may then be mounted or secured to the replacement floor assembly 12. Similarly, one or more rear seats, such as a bench seat 51, in the second row 24 of occupant seating may then be mounted or secured to the replacement floor assembly 12. See FIG. 4. In one embodiment, bench seat 51 may be provided with a 'flip and fold' feature to allow it to be used for passenger seating or to be folded away to provide additional space. As will be described in further detail herein, the seats in the first and second rows 22 and 24 of occupant seating may be removably mounted to replacement floor assembly 12, thereby allowing the vehicle user to easily configure and/or reconfigure the interior seating arrangement of the mobility assist hybrid vehicle 10.

The conversion methods described herein may also involve removing at certain components (and in some instances the entirety) of the front and rear suspension assemblies 44 and 46. Thereafter, the various body lift members or spacers 42 may be installed or mounted to the vehicle body 14. The front and rear suspension assemblies 44 and 46 then may be mounted to the body lift members 42. Body lift members or spacers 42 raise the body 14 of the vehicle 10 relative to the front and rear suspension assemblies 44 and 46 to provide the necessary ground clearance for the replacement floor assembly 12. The methods may involve other steps to complete the conversion process, some of which will be described in greater detail below and others of which will become apparent to persons having ordinary skill in the art after having become familiar with the teachings provided herein.

A significant advantage of the vehicles, assemblies, systems, and methods of the present invention is that they may be used to convert OEM hybrid vehicles to mobility assist vehicles 10 without reducing available interior room while at the same time retaining many of the attributes and performance characteristics of the unmodified vehicle. In terms of interior space, the substantially flat interior floor area 40 of the mobility assist hybrid vehicle 10 allows a wheelchair or mobility assist occupant to occupy any seating position in the front row, i.e., the driver seat 71, passenger seat 73, or corresponding seating position, or any position in the second row, i.e., seat 51 or corresponding seating position, without being hindered by elevation changes, humps, or discontinuities in the vehicle floor. In terms of vehicle attributes and performance, the assemblies, systems, and methods shown and described herein do not require modification of the rear suspension system 46, and in particular the k-frame 47 and trailing arm assemblies 49, thereby allowing the mobility assist vehicle 10 to retain the hybrid drive system of the unmodified OEM vehicle. Besides reducing the time and costs associated with the conversion process, the ability to use the OEM rear suspension assembly 46 in unmodified form allows the mobility assist vehicle 10 to retain the OEM drive configuration, i.e., either front wheel drive or all-wheel drive, as the case may be.

Still other advantages associated with the present invention is that the battery well 26 defined by the replacement floor assembly 12 allows the OEM hybrid battery 30 to be reconnected to the OEM hybrid vehicle control system, largely using unmodified existing components, including the high-voltage wiring harness and associated battery control systems, which again reduces the time and costs associated with the conversion process. Further, the ability to locate the hybrid battery below 30 the front seats, i.e., in the first row 22 of occupant seating, allows the mobility assist system 32 to be located in the second row 24 of occupant seating, thereby permitting the use of in-floor deployable ramp systems, either plain or folding, if desired. Of course, other types of mobility access systems 32, such as lifts, could be used as well.

Still yet other advantages are associated with the replacement floor assembly 12. For example, the battery well and mobility access mounting areas 26 and 28 defined by the replacement floor assembly 12 allows the mobility access system 32 and hybrid battery 30 to be housed within the interior of the vehicle 10, thereby protecting them from exposure or damage that might otherwise result from the environment and hazards external to the vehicle 10, such as water, mud, dust, road salt and impacts from external objects. The exhaust pipe channel 60 provided in the replacement floor assembly 12 prevents the exhaust system 52 from protruding below the replacement floor assembly 12, thereby improving ground clearance and protecting the exhaust system 52 from damage. The support structure 11 for the fuel tank 50 protects the fuel tank 50 in the event of collision, thereby allowing the mobility assist hybrid vehicle 10 to more easily meet applicable safety and impact requirements.

Having briefly described the vehicles, assemblies, systems, and methods of the present invention, as well as some of their more significant features and advantages, various embodiments and alternative configurations of the vehicles and methods will now be described in detail. However, before proceeding with the description, it should be noted that while the systems and methods are described herein as they could be used in conjunction with a hybrid minivan type of wheelchair or mobility assist vehicle 10 wherein the mobility access system 32 comprises a side-deploying ramp system 34, the present invention is not limited to use with such vehicles or with such mobility access systems. Persons having ordinary skill in the art will readily recognize that the systems and methods of the present invention could be used in conjunction with other types of hybrid vehicles having other types of mobility access systems. Therefore, the present invention should not be regarded as limited to the particular vehicle types and mobility access systems shown and described herein.

Referring back now to FIGS. 1 and 2, one embodiment of a mobility assist hybrid vehicle 10 may be produced or fabricated by modifying an OEM hybrid minivan vehicle (not shown in unmodified form). By way of example and in the particular embodiments shown and described herein, the OEM hybrid minivan vehicle comprises a 2021 model year Sienna minivan manufactured by the Toyota Motor Company. Alternatively, other makes and models of OEM vehicles may be converted to produce mobility assist hybrid vehicles of the type shown and described herein, as would become apparent to persons having ordinary skill in the art after having become familiar with the teachings provided herein. Accordingly, the present invention should not be regarded as limited to use with any particular type of OEM vehicle.

After the conversion methods and processes described herein have been completed, the mobility assist hybrid vehicle 10 will comprise a floor assembly 12 that has been lowered with respect to the vehicle body 14 in order to accommodate the mobility access system 32. The lowered floor assembly 12 also provides the required interior height to allow persons in mobility assist vehicles to easily ingress, egress, and move around inside the vehicle 10, as well as to meet any applicable regulations for mobility assist vehicles. For example, besides providing sufficient room to accommodate the mobility access system 32, the lowered floor assembly 12 provides for at least about 142 cm (about 56 inches) of vertical height between flat interior floor area 40 and the top portion 41 of the side door opening. See FIG. 2.

Before proceeding with the description, it should be noted that the mobility access system 32 may comprise any of a wide range of mobility access systems, such as lifts or ramps, that are now known in the art or that may be developed in the future that are, or would be, suitable for the intended application and the particular vehicle involved. Consequently, the present invention should not be regarded as limited to any particular type of mobility access system 32. However, by way of example, in one embodiment, the mobility access system 32 may comprise an in-floor deployable ramp system 34 of the type shown and described in U.S. Pat. No. 6,264,416, entitled "Compact, Slide-Out Ramp for a Minivan," which is specifically incorporated herein by reference for all that it discloses. See FIG. 2. In another embodiment, the mobility access system 32 may comprise a folding in-floor deployable ramp system 34' of the type shown and described in U.S. Pat. No. 7,033,127, entitled "Powered, Folding Ramp for a Minivan," which is also specifically incorporated herein by reference for all that it discloses. See FIGS. 3 and 4.

In any event, and regardless of the particular type of mobility access system 32 that is utilized, the lowered floor assembly 12 may replace an OEM floor assembly (again, not specifically shown) previously removed from the OEM vehicle. In the particular embodiment shown and described herein, the lowered floor assembly 12 may extend from about the first longitudinal position 16 along the length 18 of the vehicle 10 to about a second longitudinal position 20 along the length 18. The first longitudinal position 16 includes or encompasses a first row 22 of occupant seating, whereas the second longitudinal position 20 includes or encompasses the second row 24 of occupant seating. Thus, the floor assembly 12 extends from at least about the first row 22 of occupant seating (e.g., the locations of the driver and front passenger seats 71 and 73) to at least about the second row 24 of occupant seating (e.g., the location of the second row seat 51). In some embodiments, the third or rear-most row 57 of occupant seating may remain substantially undisturbed, i.e., in the original. OEM configuration. Alternatively, the third row 57 of occupant seating may be modified in some respects, if desired.

Figure 5:
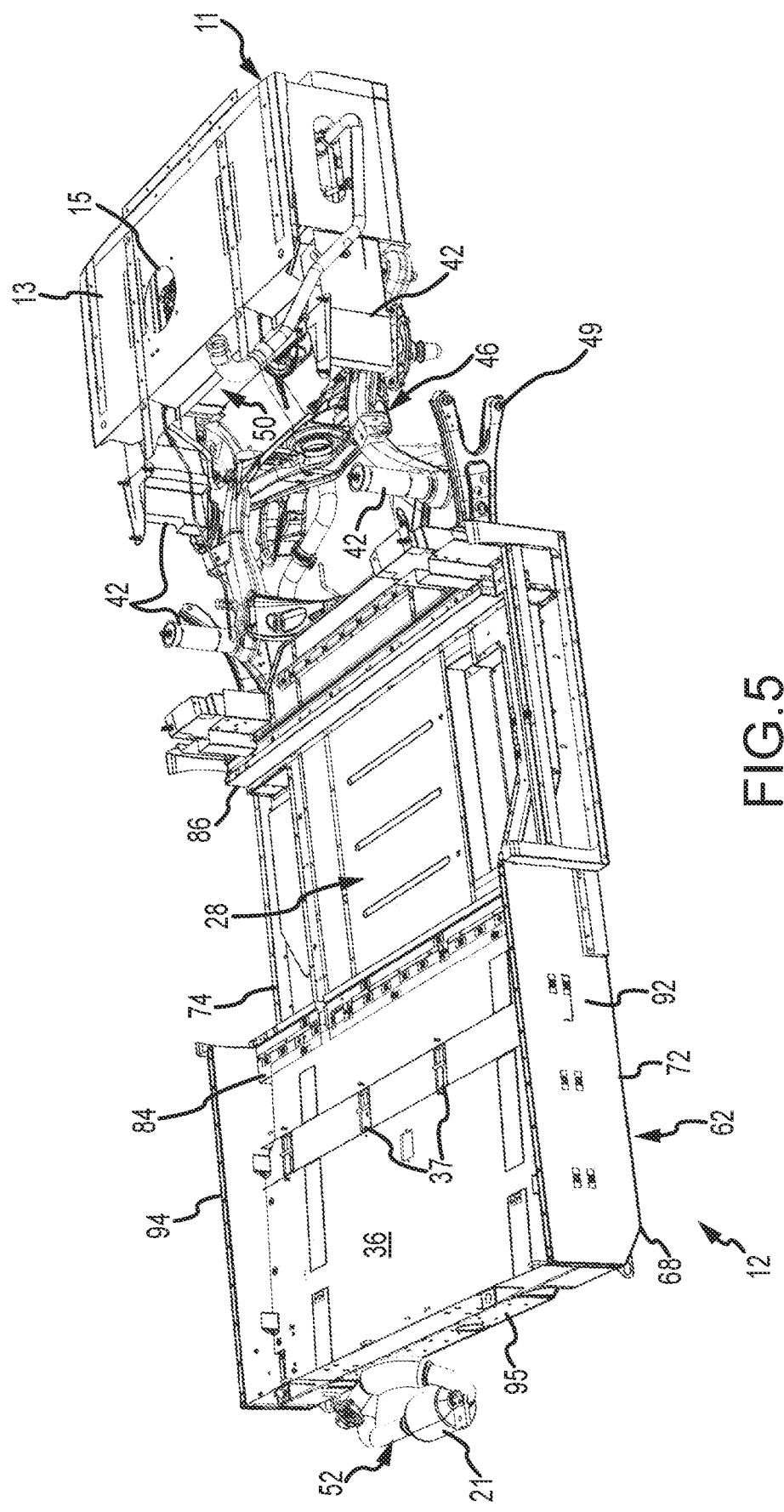
FIG. 5 is a left side perspective view of the mobility assist hybrid vehicle illustrated in FIG. 1, but with the vehicle body and other components removed to reveal aspects of the replacement floor, rear suspension, and fuel system assemblies.
Figure 6:
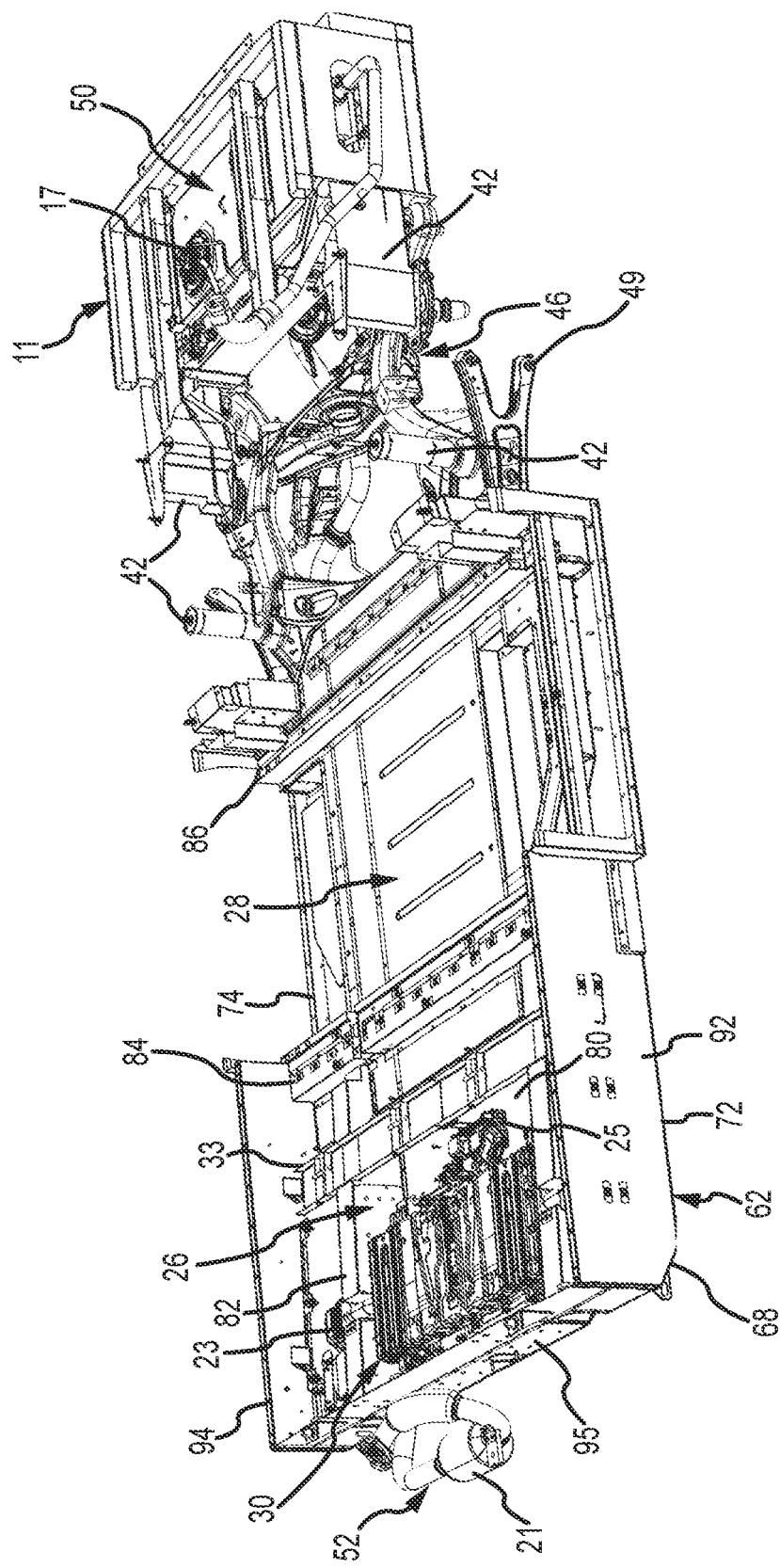
FIG. 6 is a left side perspective view of the assemblies illustrated in FIG. 5, but with the battery and fuel system cover plates removed to reveal aspects of the hybrid battery, the hybrid battery cooling system, and the fuel system.
Figure 7:
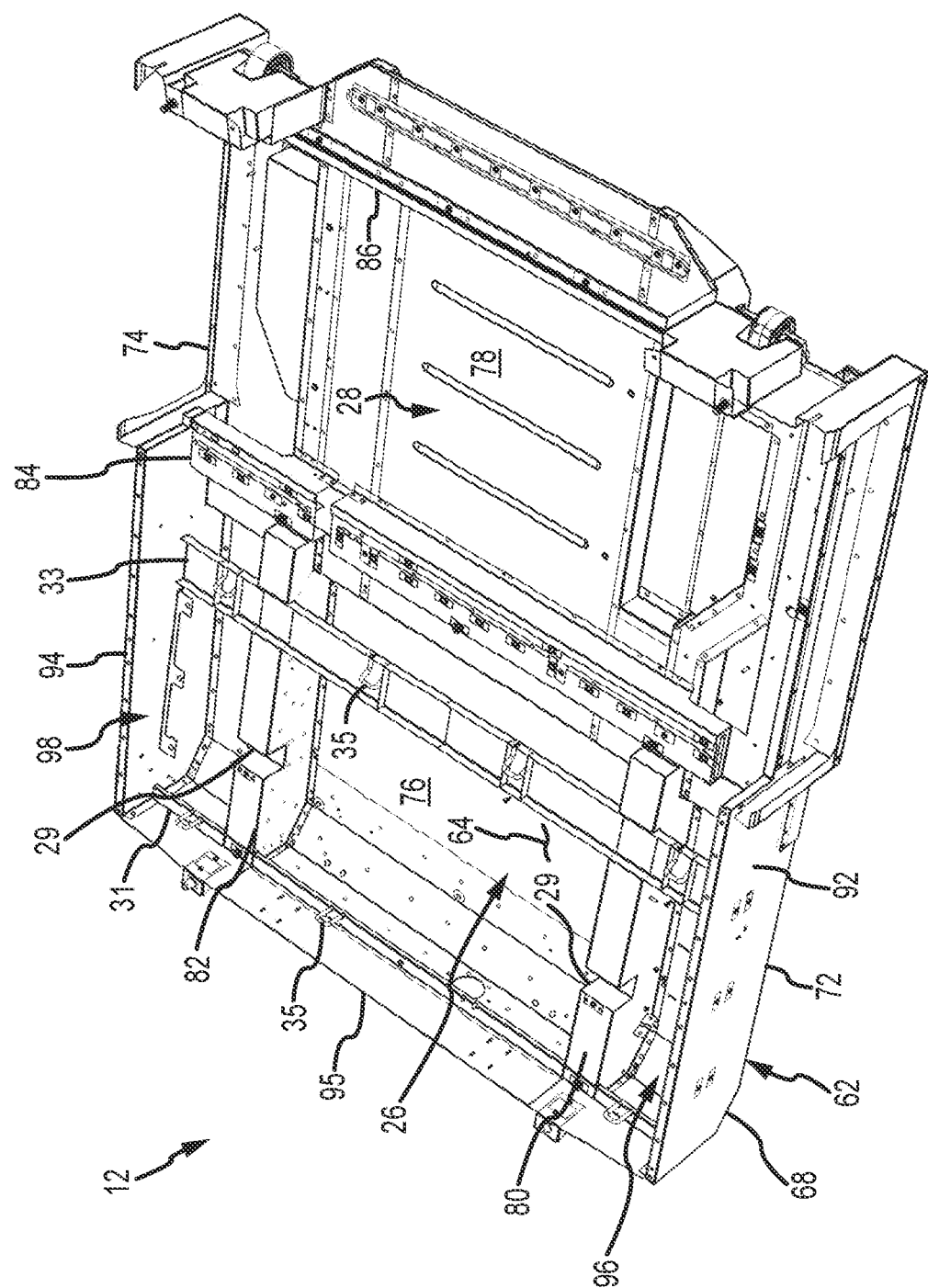
FIG. 7 is an enlarged perspective view of the floor assembly portion illustrated in FIG. 6, but with the hybrid battery and hybrid battery cooling systems removed to reveal aspects of the battery well and the seat mounting rails.
Figure 8:
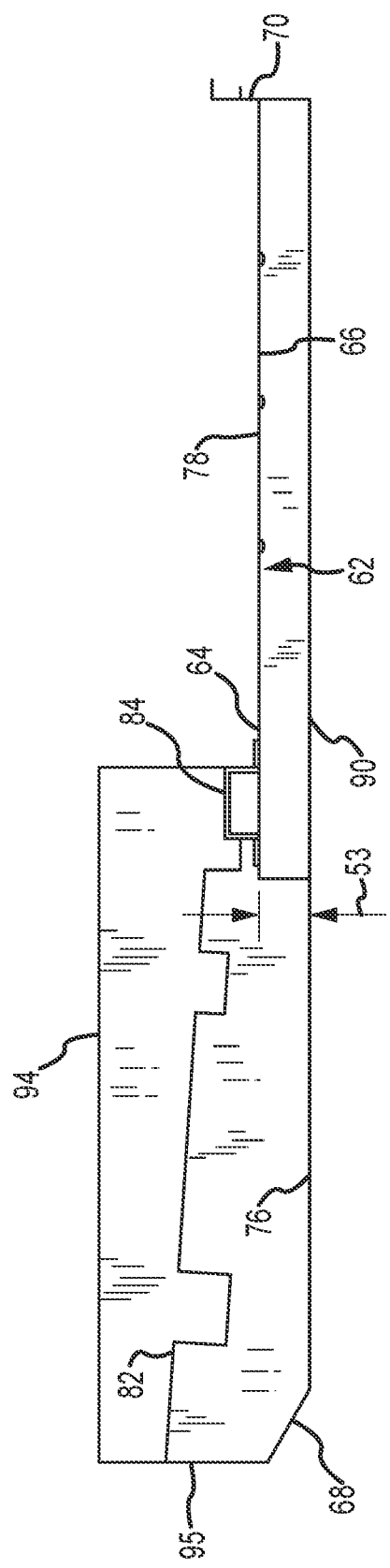
FIG. 8 is an enlarged cross-sectional left side view in elevation of the base member of floor assembly showing the offset of the front section with respect to the rear section.

With reference now primarily to FIGS. 7 and 8, with occasional reference to FIGS. 5 and 6, the floor assembly 12 may comprise a base member 62 having a top side 64, a bottom side 66, a front end 68, a rear end 70, and left and right sides 72 and 74. The front end 68 and forward portions of the left and right sides 72 and 74 together define a forward section 76 of the base member 62. Similarly, the rear end 70 and rear portions of the left and right sides 72 and 74 together define a rear section 78 of the base member 62. As will be described in greater detail below, and as best seen in FIG. 8, the forward section 76 of base member 62 may be offset from the rear section 78 of base member 62 by a distance 53 so that the forward section 76 of base member 62 is at a lower level (e.g., when installed in vehicle 10) compared to the rear section 78.

Figure 12:
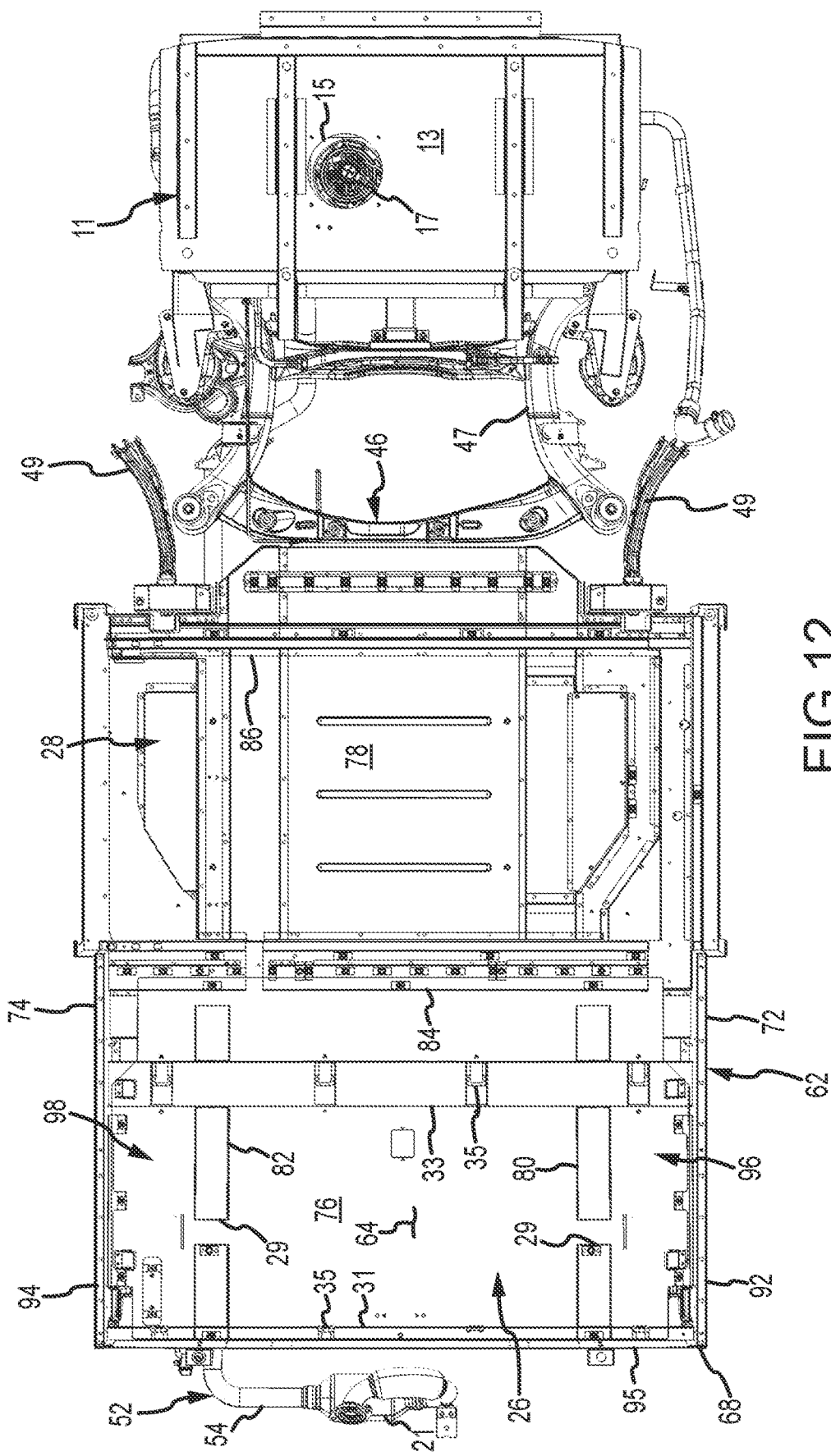
FIG. 12 is a top view of the components illustrated in FIG. 5, but with the battery cover plate, hybrid battery, and hybrid battery cooling systems removed to reveal aspects of the battery well and seat mounting rails.

Floor assembly 12 may also comprise a first longitudinal stiffener member 80 mounted to the top side 64 of base member 62. The first longitudinal stiffener member 80 extends from about the front end 68 of base member 62 to about a rear extent of the forward section 76 of base member 62, as best seen in FIG. 7. A second longitudinal stiffener member 82 is also mounted to the top side 64 of base member 62 so that it is in generally parallel, spaced-apart relation to the first longitudinal stiffener member 80. The second longitudinal stiffener member 82 also extends from about the front end 68 of base member 62 to about the rear extent of the forward section 76 of base member 62. See also FIG. 8. A first cross-member 84 is mounted to the top side 76 of base member 62 at about the rear extent of the forward section 76 of base member 62. The first cross-member 84 may extend from at least about the first longitudinal stiffener member 80 to about the second longitudinal stiffener member 82 and generally from about the left side 72 to about the right side 74 of base member 62. See also FIG. 12. The arrangement is such that the first and second longitudinal stiffener members 80 and 82 and the first cross-member 84 define the battery well 26 therebetween.

Figure 3:
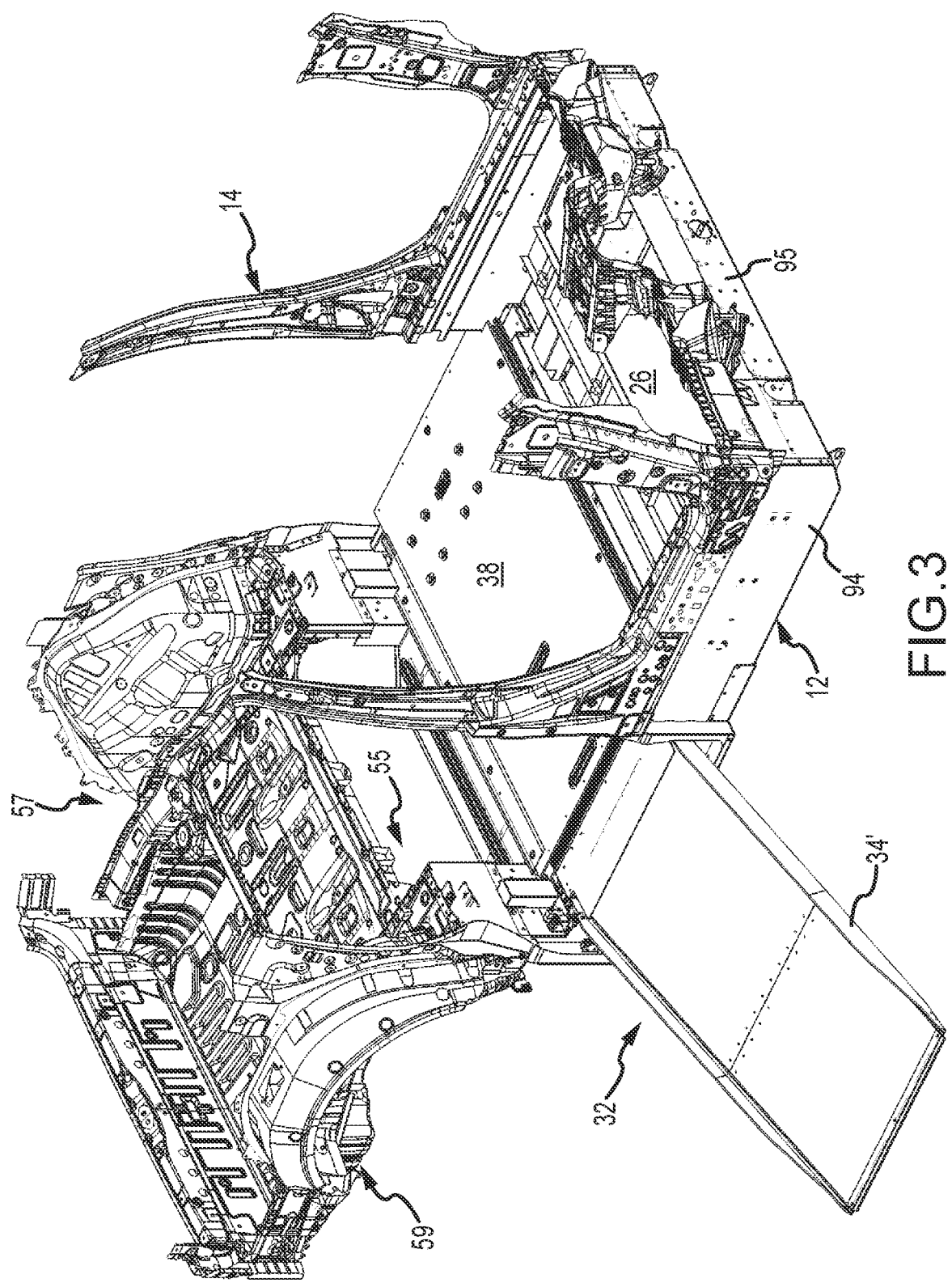
FIG. 3 is a right side view in perspective of a portion of the body structure and floor assembly of another embodiment of the mobility assist hybrid vehicle with a folding in-floor vehicle ramp shown in the deployed position.

Floor assembly 12 may also comprise a second cross-member 86 mounted to the top side 76 of base member 62 at about a rear extent of the rear section 78 of base member 62, as best seen in FIGS. 5 and 6. The second cross-member 86 may extend from about the left side 72 to about the right side 74 of base member 62. The first and second cross-members 84 and 86, together with rear portions of the left and right sides 72 and 74 define the mobility access system mounting area 28. A rear "kick-up" section 55 may be mounted to the second cross-member 86, as best seen in FIG. 3. Rear kick-up section 55 may be used to form a transition between lowered floor assembly 12 and in particular second cover plate 38 and the OEM floor section in the third or rear-most row 57 of occupant seating of the vehicle 10.

With reference now primarily to FIG. 9 with occasional reference to FIG. 8, the floor assembly 12 may also comprise a third longitudinal stiffener member 88 mounted to the bottom side 66 of base member 62. The third longitudinal stiffener member 88 extends from about the rear extent of the forward section 76 of base member 62 to about the rear end 70 of base member 62. A fourth longitudinal stiffener member 90 is also mounted to the bottom side 66 of base member 62 so that it is in generally parallel, spaced-apart relation to the third longitudinal stiffener member 88. See also FIG. 8. The fourth longitudinal stiffener member 90 also extends from about the rear extent of the forward section 76 of base member 62 to about the rear end 70 of base member 62. In the particular embodiment shown and described herein, first and second longitudinal stiffener members 80 and 82 are mounted to the top side 64 of floor assembly 12 at respective first and second lateral positions that are generally outboard of respective third and fourth lateral positions for the third and fourth longitudinal stiffener members 88 and 90, as best seen by comparing FIGS. 7 and 9.

Referring back now primarily to FIG. 7, the floor assembly 12 may also comprise first and second flange members 92 and 94 mounted to the left and right sides 72 and 74, respectively, of forward section 76 of base member 62 so that they are generally perpendicular to the forward section 76 of base member 62. A front flange member 95 may be mounted to the front end 68 of base member 62 so that front flange member 95 is also generally perpendicular to the forward section 76 of base member 62. See also FIG. 8. The flange members 92, 94, and 95 may be secured to portions the vehicle body 14, as best seen in FIG. 3.

As will be described in greater detail below, the first flange member 92 and first longitudinal stiffener member 80 define a first battery cooling system mounting area 96 therebetween. Similarly, the second flange member 94 and the second longitudinal stiffener member 82 define a second battery cooling system mounting area 98 therebetween. See FIGS. 12 and 13.

Floor assembly 12 may also include first and second seat mounting rails 31 and 33 mounted to the first and second longitudinal stiffener members 80 and 82. See FIGS. 7 and 12. The arrangement is such that the first and second seat mounting rails 31 and 33 are in generally parallel, spaced-apart relation. The first seat mounting rail 31 may be located at a forward position, generally abutting the front flange member 95, whereas the second seat mounting rail 33 may be located at a rearward position along the longitudinal stiffener members 80 and 82. The first and second seat mounting rails 31 and 33 may be provided with a plurality of mounting lugs 35 thereon that are sized and spaced to releasably engage corresponding latches (not shown) that may be provided on seat adapter assemblies 75 and 77 (FIG. 2). Battery cover plate 36 may define a plurality of openings 37 therein to allow the mounting lugs 35 to be releasably engaged by the latches provided on the seat adapter assemblies 75, 77, as best seen in FIG. 5.

The various components of the floor assembly 12 may be manufactured from any of a wide range of materials now known in the art or that may be available in the future, such as metals (e.g., steel or aluminum alloys), plastics, composite materials, or various combinations thereof, that are or would be suitable for the particular installation. Therefore, the present invention should not be regarded as limited to any particular material or combinations of materials. By way of example, in one embodiment base member 62 may be formed from sheet steel. Base member 62 may be formed either as a single piece or from multiple pieces, as would become apparent to persons having ordinary skill in the art after becoming familiar with the teachings provided herein. If multiple pieces are used to construct base member 62, they may be fastened together may any of a wide range of fastening systems, such as by welding, by riveting, by adhesives, or by various combinations thereof. In an embodiment wherein the forward section 76 of base member 62 is offset with respect to the rear section 78, e.g., so that the forward section 76 is lower than the rear section 78 by a distance 53 (FIG. 8), the offset sections 76 and 78 may be made by forming or bending a single sheet of material with the desired offset. Alternatively, two separate sheets of material may be used.

The various stiffener members 80, 82, 88, and 90, as well as cross-members 84 and 86 also may be formed from sheet material (e.g., sheet steel) provided with suitable cross-sections, such as hat-shaped cross-sections, although other cross-sections may be used. The various stiffener and cross-members may be mounted to base member 62 by spot-welding. Alternatively, other fastening techniques and systems could be used. The first, second, and front flanges 92, 94, and 95, also may be formed from sheet material and fastened to base member 62 by any of a wide range of fastening systems. Alternatively, first, second, and front flanges 92, 94, and 95, either separately or together, could be formed by upturning the sides 74, 74 and front end 68 of the forward section 76 of base member 62. In the particular embodiment shown and described herein, the front flange 95 is formed by upturning the front end 68 of forward section 76 of base member 62, as best seen in FIG. 8. The first and second flanges 92 and 94 comprise separate pieces that are then fastened or mounted to the forward section of base member 62, e.g., by spot-welding.

With reference now to FIGS. 5, 6, 10, and 12, the mobility assist vehicle 10 also comprises a fuel tank 50 that is mounted at a position behind or aft of the rear suspension assembly 46. In an embodiment wherein the mobility assist vehicle 10 is converted from an OEM vehicle having the fuel tank located in front or forward of the rear suspension assembly 46, it will be necessary to relocate the OEM fuel tank to provide sufficient space for the lowered floor assembly 12. Fuel tank 50 could comprise either the OEM fuel tank or a replacement fuel tank. However, in most instances it will be advantageous for fuel tank 50 to comprise a replacement fuel tank, as the OEM fuel tank will usually be specifically configured (e.g., molded) to occupy the particular mounting space provided for it in the OEM vehicle. A suitable mounting space for fuel tank 50 may be created by removing the rear floor well assembly 59 located behind the third or rear-most row 57 of occupant seating of the OEM vehicle and replacing it with a support structure 11 and raised floor 13. See also FIGS. 1 and 3. Support structure 11 may be mounted to the vehicle body 14 and/or body lift members 42. Raised floor 13 may be mounted to a top side of support structure 11 and may define an access opening 15 to allow access to a fuel pump and fuel gage assembly 17 associated with fuel tank 50, as best seen in FIG. 6. Fuel tank 50 may be connected to an OEM evaporative emission control system (not shown). In one embodiment, the OEM evaporative emission control system (not shown) may be located in its original position above the rear suspension assembly 46.

Figure 11:
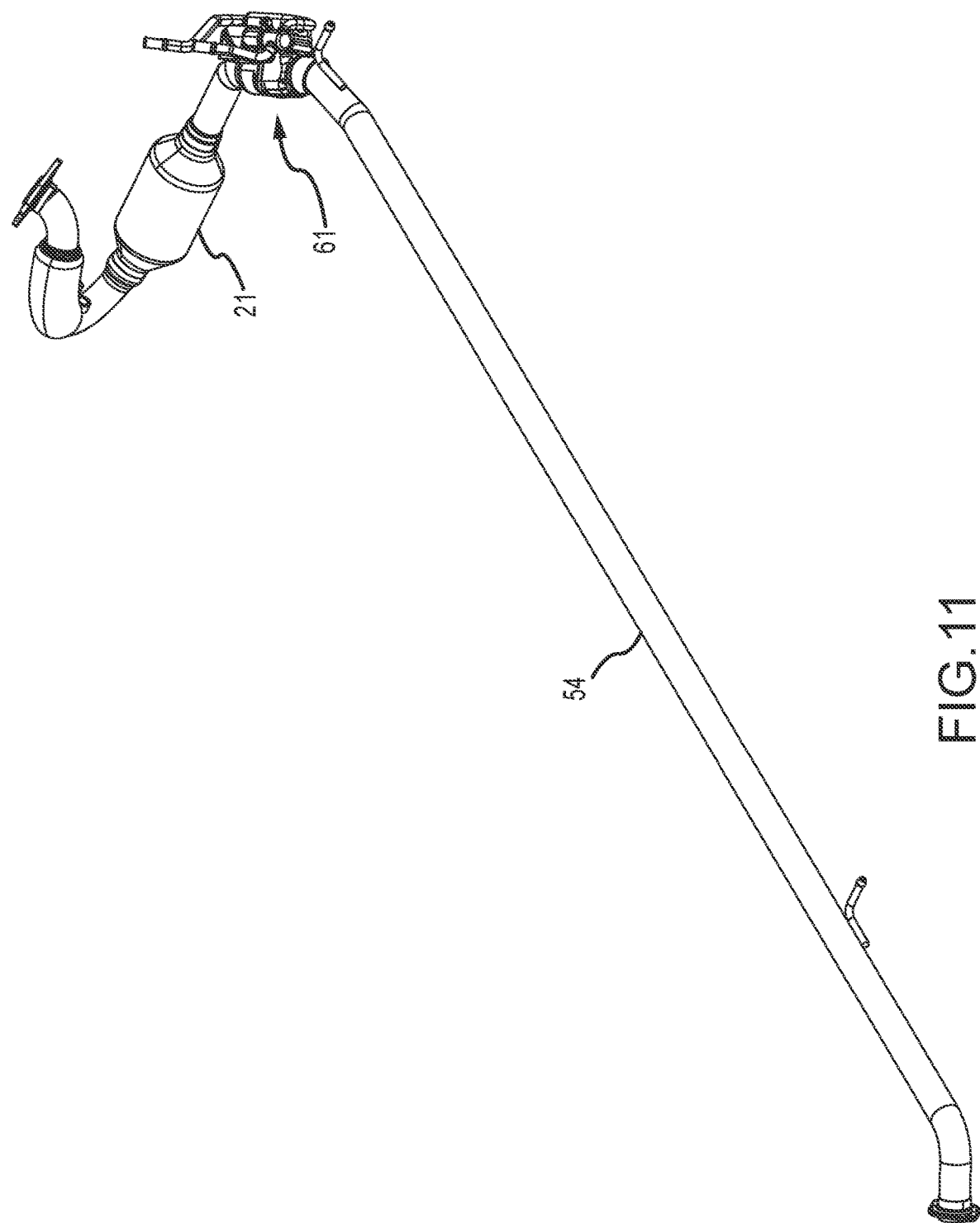
FIG. 11 is a perspective view of another embodiment of an exhaust system having an engine cooling system heat exchanger mounted thereto.

Mobility assist vehicle 10 may also include an exhaust system 52, as best seen in FIGS. 9-11. In the particular embodiment shown and described herein, the configuration of exhaust system 52 represents a significant departure from the configuration of the OEM exhaust system (not shown) of the OEM vehicle, primarily because of lowered floor assembly 12. The exhaust system 52 of mobility assist hybrid vehicle 10 may comprise an intermediate pipe 54, a muffler 56, and a tail pipe 58. Intermediate pipe 54 extends from a catalytic converter 21 to muffler 56 and includes a portion that passes through the exhaust pipe channel 60 defined by floor assembly 12, as best seen in FIG. 9. In the particular embodiment shown and described herein, the forward portion of the exhaust pipe channel 60, i.e., the portion traversing the forward section 76 of base member 62 of floor assembly 12, is defined by the second longitudinal cross member 82. See also FIG. 12. The section of intermediate pipe 54 traversing the rearward section 78 of base member 62 runs along (i.e., beside) fourth longitudinal stiffener member 90, as best seen in FIG. 9.

Depending on the particular OEM vehicle that is used as the basis for mobility assist hybrid vehicle 10, it may be necessary or desirable to relocate or reposition the catalytic converter 21 to accommodate lowered floor assembly 12. Catalytic converter 21 shown and described herein has be relocated from its original position in the OEM vehicle. With reference now to FIG. 11, some OEM vehicles may utilize an exhaust heat exchanger system 61 to provide for faster warm-up of the engine coolant by capturing heat from the exhaust system 52. If such a heat exchanger system 61 is provided or required, it may be positioned at a location downstream from the relocated catalytic converter 21, but before the intermediate pipe 54 enters the exhaust pipe channel 60 defined by floor assembly 12.

Muffler 56 of exhaust system 52 is positioned at a location aft of the rear suspension assembly 46 and underneath or below fuel tank 50. See FIGS. 1, 9, and 10. Muffler 56 may be mounted to suitable hangers (not shown) attached to vehicle body 14, the support structure 11, or various combinations thereof. Tail pipe 58 may extend from muffler 56 to a suitable location at the rear of vehicle 10.

The mobility assist hybrid vehicle 10 may be produced from an OEM hybrid vehicle in accordance with the methods described herein. As mentioned, in the particular embodiment shown and described herein, the mobility assist hybrid vehicle 10 is made or produced by modifying a 2021 model year Sienna minivan manufactured by the Toyota Motor Company. Alternatively, other vehicle makes and models could be converted, as would become apparent to persons having ordinary skill in the art after becoming familiar with the teachings provided herein. However, before describing the methods that may be used in one embodiment, it should be noted that various steps in the method need not necessarily be performed in the order described herein. The various steps could be performed in any of a wide range of orders depending on the particular vehicle involved, any desired or required assembly line sequence, or other factors. Also, it should be noted that the method steps shown and described herein represent those steps or modifications required to achieve the objects and advantages of the present invention. Other steps and modifications may be required that are not described herein, but nevertheless would become apparent to persons having ordinary skill in the art.

Figure 13:
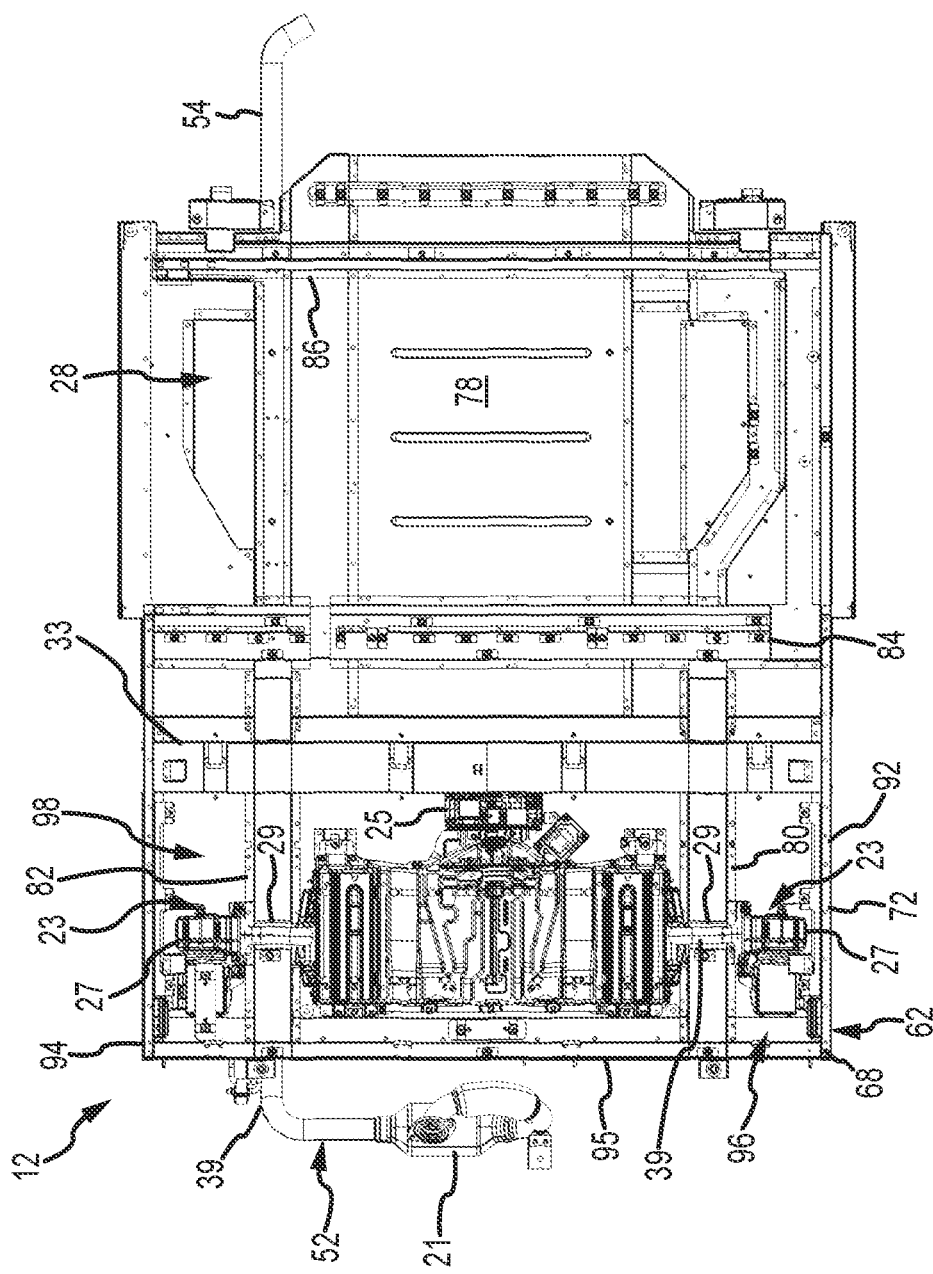
FIG. 13 is a top view of the floor assembly illustrated in FIG. 6 showing aspects of the hybrid battery and hybrid battery cooling systems.

A first step in the method of producing the mobility assist hybrid vehicle 10 may involve removing the hybrid battery 30 and certain related components from the OEM hybrid vehicle. The hybrid battery 30 of the particular OEM vehicle that is converted to produce the mobility assist hybrid vehicle 10 is located at a position generally below and between the driver and front passenger seats of the OEM vehicle. In addition to removing the hybrid battery 30, it will also be necessary to remove the existing battery cooling and control/charging systems 23 and 25 operatively associated with the hybrid battery 30. It should be noted that the battery cooling and control/charging systems 23 and 25 are not shown in the drawing figures in their OEM mounting locations. Instead, the battery cooling and control/charging systems 23 and 25 are illustrated in FIGS. 6 and 13 in their relocated positions in the battery well 26 of floor assembly 12. Of course, other components and systems associated with the OEM vehicle, such as substantial portions of the interior, as well as the OEM fuel and exhaust systems, would also need to be removed in order to perform the methods described herein. It may also be desirable at this juncture to remove the front and rear suspension assemblies 44 and 46, although they could be removed at a different point in the conversion process.

After the required systems and components of the OEM vehicle are removed, a portion of the OEM vehicle floor assembly is then removed to make room for the floor assembly 12. In one embodiment, the removed portion of the OEM floor assembly extends from about the first longitudinal position 16 along the vehicle length 18 to about the second longitudinal position 20. See FIG. 1. As already described, the first longitudinal position 16 includes or encompasses the first row 22 of occupant seating, whereas the second longitudinal position 20 includes or encompasses the second row 24 of occupant seating. Stated simply, then, the floor of the OEM vehicle is removed from about the firewall back to the beginning of the third row or rear-most row 57 of occupant seating and along substantially the entire width of the vehicle. See also FIG. 3.

Next, the floor assembly 12 may be mounted to the vehicle body 14, thereby replacing the removed OEM floor assembly. After being installed, the previously removed hybrid battery 30 may be mounted within the battery well 26. Elements of the OEM battery cooling system 23, such as blower assemblies 27, may be mounted with the first and second battery cooling system areas 96 and 98 in either side of battery well 26, as best seen in FIG. 13. A suitable duct system 39, passing through openings 29 provided in the first and second longitudinal stiffener members 80 and 82 may be used to fluidically connect the blower assemblies 27 to battery well 26. See also FIG. 7. Similarly, elements of the OEM battery control/charging system 25 may be mounted adjacent hybrid battery 30. See FIG. 13. Hybrid battery 30 and related components, e.g., battery cooling system 23 and battery control/charging system 25 may then be operatively connected to the appropriate systems of the OEM vehicle.

Significantly, the location of the hybrid battery 30 within battery well 26 allows the battery 30 to be reconnected to the vehicle largely, if not entirely, with unmodified OEM components. For example, in one embodiment, the unmodified OEM high-voltage wiring harness (not specifically shown) may be used to reconnect the hybrid battery 30 to the vehicle propulsion system.

Figure 4:
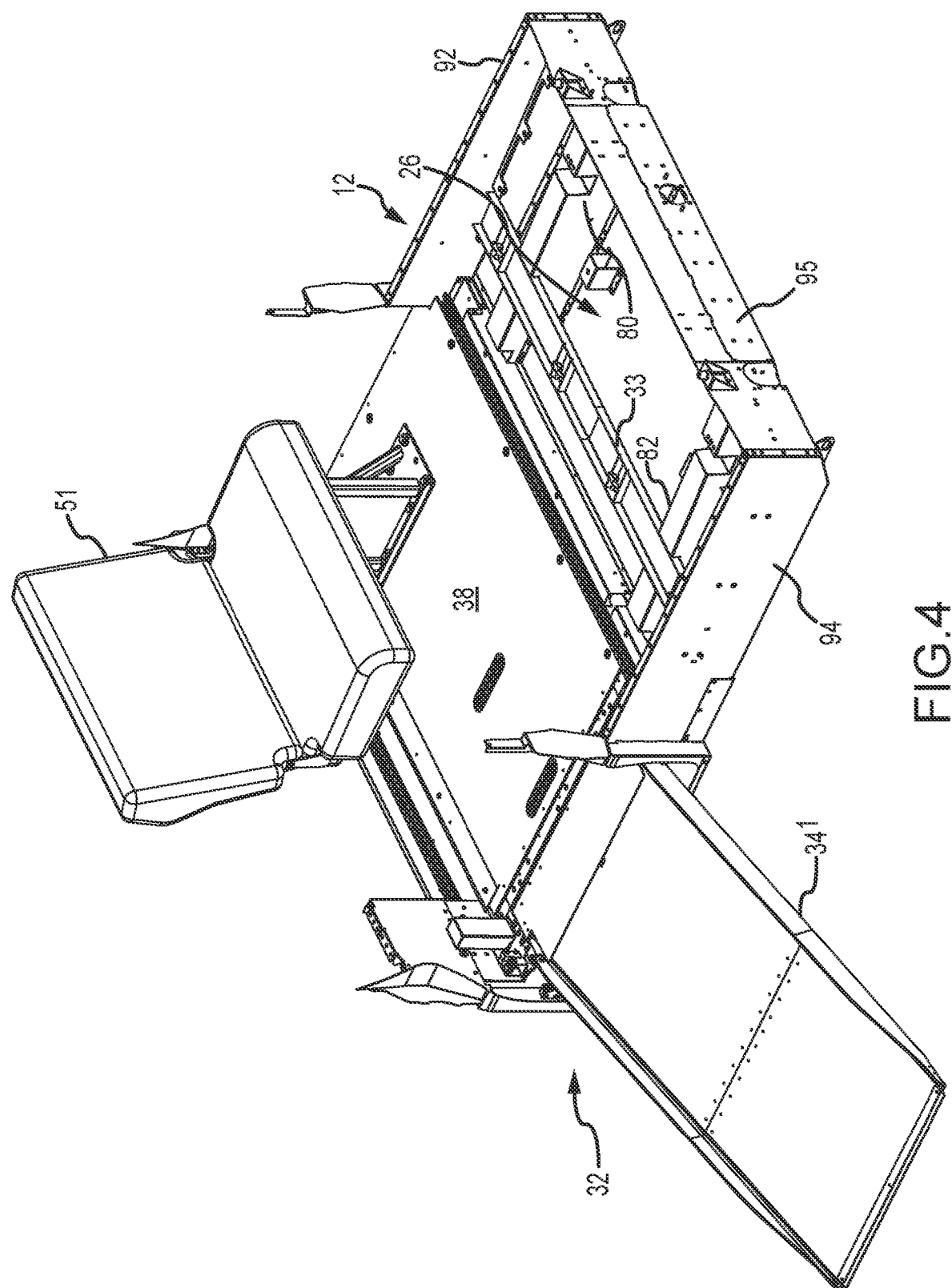
FIG. 4 is a right side view in perspective of the floor assembly illustrated in FIG. 3 showing a bench seat in the second row of occupant seating.

If not previously installed, the mobility access system 32 (FIGS. 1-4) may be mounted within the mobility access system mounting area 28 defined by floor assembly 12. As mentioned earlier, mobility access system 32 may comprise any of a wide range of mobility access systems, such as lifts or ramps, that are now known in the art or that may be developed in the future that are, or would be, suitable for the intended application. By way of example, in one embodiment, the mobility access system 32 comprises an in-floor deployable ramp system 34 of the type shown and described in U.S. Pat. No. 6,264,416. See FIG. 2. Alternatively, and as best seen in FIGS. 3 and 4, the mobility access system 32 could comprise a folding in-floor deployable ramp system 34' of the type shown and described in U.S. Pat. No. 7,033,127.

Next, the first and second cover plates 36 and 38 may be secured or mounted over the battery well 26 and mobility access system 32, respectively, to define the substantially flat interior floor area 40 for at least the first and second rows 20 and 24 of occupant seating. See FIGS. 1 and 2. The flat interior floor area 40 allows a person in a mobility access device to move freely between the first and second rows 22 and 24 of occupant seating, either to operate the vehicle 10 or to ride along in any desired seating position. Of course, suitable seats, such as driver seat 71, passenger seat 73 (FIG. 2) or bench seat 51 (FIG. 4), may be reinstalled at the appropriate locations on the flat interior floor area 40. In most instances the driver and passenger seats 71 and 73 may be provided with suitable adapter assemblies 75 and 77 (FIG. 2) to allow them to be reinstalled and positioned at the desired height.

As mentioned earlier, the conversion method may also involve removing the front and rear suspension assemblies 44 and 46, or at least portions thereof, to allow for the installation of the various body lift members or spacers 42. The various body lift members or spacers 42 raise or elevate the vehicle body 14 with respect to the front and rear suspension assemblies 44 and 46 to provide the clearance required for the lowered floor assembly 12. While the degree of lift required may vary depending on a wide range of considerations by way of example, in one embodiment, the body lift members or spacers 42 provide a lift of about 20.3 cm (about 8 inches) for the front suspension assembly 44 and about 21.6 cm (about 8.5 inches) for the rear suspension assembly 46. The lift provided by body lift members 42 will provide an overall vehicle ground clearance of about 14 cm (about 5.5 inches).

Figure 14:
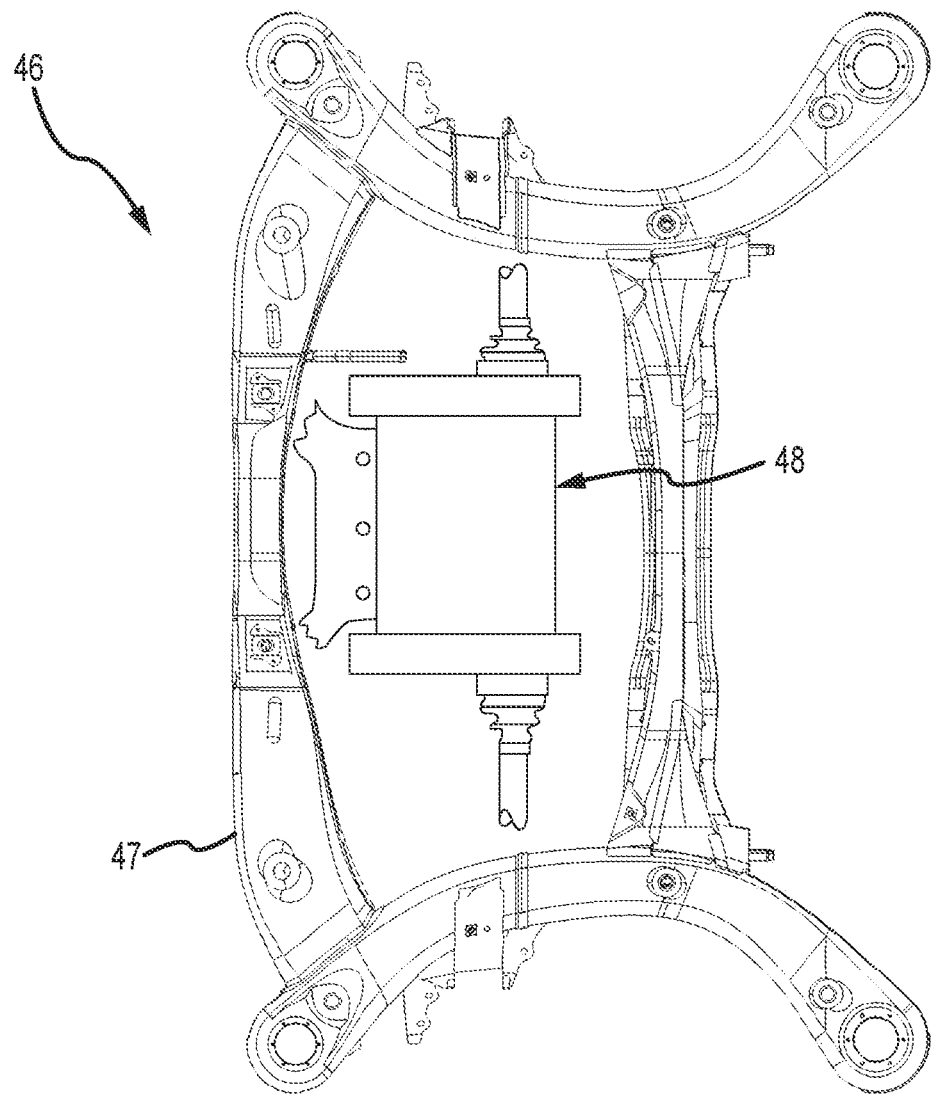
FIG. 14 is an enlarged top view of a combined rear suspension and drive motor assembly of an alternate embodiment of the mobility assist hybrid vehicle having an all-wheel drive configuration.

Significantly, as was already described, if the OEM hybrid vehicle being converted comprises an all-wheel drive vehicle having a drive motor 48 mounted to the 'k-frame' 47 of rear suspension assembly 46, as illustrated in FIG. 14, the mobility assist hybrid vehicle 10 will also have all-wheel drive capability because the k-frame 47 of OEM rear suspension assembly 46 and drive motor 48 may be simply installed or mounted to the rear body lift members 42, as best seen in FIGS. 5, 6, 9, 10, and 12. The drive motor 48 is not illustrated in FIGS. 5, 6, 9, 10, and 12, but could be mounted (e.g., as an optional accessory) to the k-frame 47 of rear suspension assembly 46. In many instances, the OEM wiring harness (not shown) in unmodified form may be used to connect the drive motor 48 to the OEM vehicle propulsion system, although it may be necessary to use new cable armoring or conduit systems to accommodate the changes occasioned by the installation of floor assembly 12.

In many embodiments it will be necessary to modify the OEM fuel and exhaust systems to accommodate the lowered floor assembly 12. For example, an in an embodiment wherein the OEM vehicle has a fuel tank located in front of the rear suspension assembly, it will be necessary to remove the OEM fuel tank. Thereafter, the rear floor well assembly 59 (FIG. 3) located at the rear of the vehicle, behind the third row 57 of occupant seating may be removed and replaced with a support structure 11 and raised floor 13, as best seen in FIGS. 5, 6, 9, 10, and 12. Support structure 11 may be mounted to the vehicle body 14 and/or body lift members 42. Raised floor 13 may be mounted to a top side of support structure 11 and thereby serve as raised interior floor section behind the third row 57 of occupant seating. Fuel tank 50 may then be mounted within support structure 11, underneath the raised floor 13, as best seen in FIGS. 6, 9, and 10. If desired, raised floor 13 may be provided with or define an access opening 15 to allow access to the fuel pump assembly 17 of fuel tank 50. Thereafter, fuel tank 50 may be connected to the OEM evaporative emission control system (not shown) and other components (also not shown) of the OEM fuel system.

In most instances, it will be necessary to remove the exhaust system of the OEM vehicle and replace it with exhaust system 52. See FIGS. 9-11. Depending on the particular vehicle being converted and the particular structure of the floor assembly 12, it may also be necessary to relocate or reposition the catalytic converter 21 and a heat exchanger assembly 61, if utilized. The intermediate pipe 54 may then be connected to the catalytic converter 21 and routed toward the rear of the vehicle 10. At least a portion of the intermediate pipe 54 passes through the exhaust pipe channel 60 defined by floor assembly 12 so that the intermediate pipe 54 does not further reduce the ground clearance of the mobility assist hybrid vehicle 10. See FIG. 10. The muffler 56 may then be mounted below fuel tank 50 by means of suitable hangers (not shown) mounted to the vehicle body 14 and/or support structure 11. Thereafter, the rear end of intermediate pipe 54 may be connected to muffler 56. Tailpipe 58 may then be connected to the outlet of muffler 56 and routed to an appropriate location at the rear of the vehicle 10, as best seen in FIGS. 9 and 10.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A method of producing a mobility assist hybrid vehicle from a hybrid vehicle, the hybrid vehicle having at least first and second rows of occupant seating located at respective first and second longitudinal positions along a length of the hybrid vehicle, the hybrid vehicle also having a hybrid battery, the method comprising:

removing the hybrid battery;

removing at least a portion of a floor of the hybrid vehicle, the removed portion of the floor including at least a portion of the floor extending from about the first longitudinal position to about the second longitudinal position;

mounting a replacement floor assembly to the hybrid vehicle, the replacement floor assembly defining a battery well sized to receive the hybrid battery, the battery well being located at about the first longitudinal position, the replacement floor assembly also being configured to receive a mobility access system at about the second longitudinal position;

mounting the hybrid battery within the battery well of the replacement floor assembly;

placing a first cover plate over the hybrid battery;

mounting the mobility access system to the replacement floor assembly; and placing a second cover plate over the mobility access system, the first and second cover plates defining a substantially flat interior floor area for the first and second rows of occupant seating.

2. The method of claim 1, further comprising electrically connecting the hybrid battery to said wheelchair-accessible hybrid vehicle using unmodified existing components of the hybrid vehicle.

3. The method of claim 2, wherein said electrically connecting the hybrid battery to said wheelchair-accessible hybrid vehicle further comprises electrically connecting the hybrid battery using an unmodified existing battery wiring harness of the hybrid vehicle.

4. The method of claim 1, wherein mounting the mobility access system to the replacement floor assembly comprises mounting an in-floor deployable ramp system to the replacement floor assembly.

5. The method of claim 1, wherein mounting the mobility access system to the replacement floor assembly comprises mounting a folding in-floor deployable ramp system to the replacement floor assembly.

6. The method of claim 5, wherein the replacement floor assembly defines an exhaust pipe channel therein, and wherein said method further comprises:

removing an exhaust system from the hybrid vehicle; and installing a replacement exhaust system, a portion of the replacement exhaust system passing through the exhaust pipe channel defined by the replacement floor assembly.

7. The method of claim 6, wherein the replacement exhaust system comprises a muffler, and wherein said installing the replacement exhaust system further comprises mounting a muffler at a location aft of the rear suspension assembly.

8. The method of claim 1, wherein the hybrid vehicle comprises a rear suspension assembly and a fuel tank, the fuel tank being located at a position forward of the rear suspension assembly, wherein said method further comprises:

removing the fuel tank from the hybrid vehicle; and installing a replacement fuel tank at a location aft of the rear suspension assembly.

9. The method of claim 8, further comprising:

removing the rear suspension assembly from the hybrid vehicle;

attaching rear body lift brackets to the hybrid vehicle; and mounting the rear suspension assembly to the rear body lift brackets.

10. The method of claim 9, further comprising:

removing a front suspension assembly from the hybrid vehicle;

attaching front body lift brackets to the hybrid vehicle; and mounting the front suspension assembly to the front body lift brackets.

11. The method of claim 1, wherein the hybrid vehicle comprises an all-wheel drive hybrid vehicle having a combined rear suspension and drive motor assembly, wherein said method further comprises:

removing the combined rear suspension and drive motor assembly from the hybrid vehicle;

attaching rear body lift brackets to the hybrid vehicle; and mounting the combined rear suspension and drive motor assembly to the rear body lift brackets.

12. A method of producing a wheelchair-accessible hybrid vehicle from an hybrid vehicle, the hybrid vehicle having at least first and second rows of occupant seating located at respective first and second longitudinal positions along a length of the hybrid vehicle, the hybrid vehicle also having a hybrid battery, the method comprising:

removing at least a portion of a floor of the hybrid vehicle, the removed portion of the floor including at least a portion of the floor that extends from about the first longitudinal position to about the second longitudinal position;

mounting a replacement floor assembly to the hybrid vehicle, the replacement floor assembly defining a battery compartment sized to receive the hybrid battery, the battery compartment being located at about the first longitudinal position;

positioning the hybrid battery within the battery compartment of the replacement floor assembly;

placing a cover over the electric storage battery; and mounting a mobility access system to the replacement floor assembly at about the second longitudinal position to produce said wheelchair-accessible hybrid vehicle, portions of said replacement floor assembly and said cover defining a substantially flat interior floor area that extends substantially continuously from about the first longitudinal position to about the second longitudinal position.

\* \* \* \* \*